3,203,930
ORGANOBORON POLYMERS AND METHOD
OF MAKING SAME
Joseph G. Bower, Orange, Calif., assignor to United States
Borax & Chemical Corporation, Los Angeles, Calif., a
corporation of Nevada
No Drawing. Filed July 2, 1962, Ser. No. 207,049
8 Claims. (Cl. 260—47)

The present invention relates as indicated to a new class of organoboron polymers and has further reference to a method for preparing these polymers.

I have found that the reaction of a bisphenol and a substituted borazole results in an organoboron polymer which is thermally stable at temperatures up to 400–500° C.

It is the principal object of the present invention to provide a new class of thermally stable organoboron polymers.

It is a further object of this invention to provide an efficient method for preparing these thermally stable organoboron polymers.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises organoboron polymers having the recurring structural unit

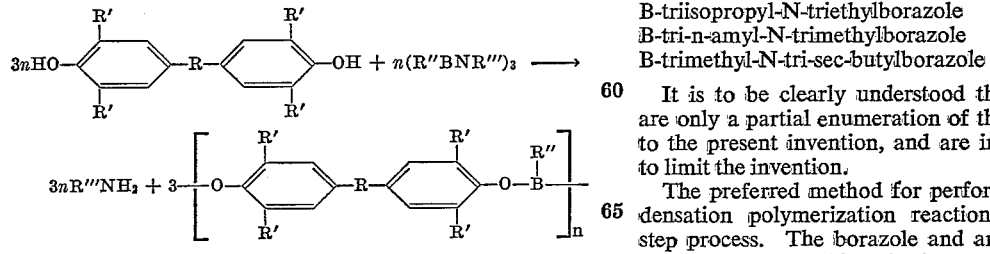

where R is selected from the group consisting of methylene, 2,2-propylene, and 2,2-butylene, R' is selected from the group consisting of hydrogen, bromine, chlorine and alkyl of from 1 to 4 carbon atoms, and R'' is selected from the group consisting of alkyl of from 1 to 6 carbon atoms and phenyl.

The organoboron polymers of the present invention find a variety of industrial applications. They have excellent adhesive properties and can be used for bonding such materials as glass, wood and metals. They also find utility as binders in the preparation of fiberglass cloth laminates, and as active ingredients in the preparation of new adhesive compositions. Additionally these polymers are useful as protective coatings, as neutron absorption materials, and as molding and casting resins.

The preparation of the present organoboron polymers can best be illustrated by the following equation:

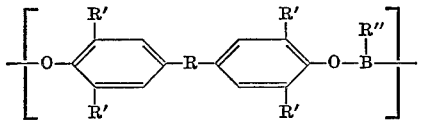

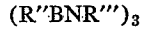

where R is methylene, 2,2-propylene or 2,2-butylene, R' is hydrogen, bromine, chlorine or an alkyl of from 1 to 4 carbon atoms, R'' is either phenyl or an alkyl of from 1 to 6 carbon atoms, and R''' is hydrogen, or an alkyl of from 1 to 4 carbon atoms.

As can be seen from the foregoing equation, the preparation of the present organoboron polymers is accomplished by the reaction of an applicable bisphenol compound with a substituted borazole. The present polymerization reaction will proceed when there is an excess of either reactant present, however, for the sake of economy and ease of recovery, in the preferred embodiment of the invention I perform the polymerization reaction using the bisphenol and borazole reactants in about a 3 to 1 molar ratio.

The bisphenol compounds applicable to the present invention have the formula

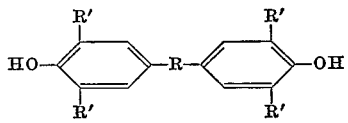

where R and R' are defined as above. The compounds are known in the art and are presently commercially available materials. The following list is illustrative of the bisphenol compounds applicable to the present invention:

p,p'-Methylenebisphenol
p,p'-Isopropylidenebisphenol
p,p'-Sec-butylidenebisphenol
4,4'-methylene-bis(2,6-diethylphenol)
4,4'-methylene-bis(2,6-dichlorophenol)
4,4'-methylene-bis(2-bromophenol)
4,4'-isopropylidene-bis(2-tert-butylphenol)
4,4'-isopropylidene-bis(2,6-dibromophenol)
4,4'-isopropylidene-bis(2-isopropylphenol)
4,4'-sec-butylidene-bis(2,6-dimethylphenol)
4,4'-sec-butylidene-bis(2,6-di-n-propylphenol)
4,4'-sec-butylidene-bis(2-chlorophenol)

As regards the substituted borazole reactants applicable to the present invention, they have the formula $$(R''BNR''')_3$$

where R'' is either an alkyl of from 1 to 6 carbon atoms or phenyl, and R''' is hydrogen or an alkyl of from 1 to 6 carbon atoms. These compounds and means for their preparation are known in the art. The following list is illustrative of the substituted borazoles applicable to the present invention:

B-trimethylborazole
B-triethylborazole
B-triisopropylborazole
B-tri-sec-butylborazole
B-tri-n-hexylborazole
B-triphenylborazole
Hexamethylborazole
Hexaisopropylborazole
Hexa-n-butylborazole
B-triphenyl-N-trimethylborazole
B-triethyl-N-tri-n-propylborazole
B-triisopropyl-N-triethylborazole
B-tri-n-amyl-N-trimethylborazole
B-trimethyl-N-tri-sec-butylborazole It is to be clearly understood that the foregoing lists are only a partial enumeration of the reactants applicable to the present invention, and are in no manner intended to limit the invention.

The preferred method for performing the present condensation polymerization reactions is a direct single-step process. The borazole and an applicable bisphenol compound are combined in the presence of a heat transfer medium inert to the reactants, in an inert atmosphere. The reaction mixture is then heated under reflux and the primary amine reaction product is removed as a volatile by-product. The desired organoboron polymer is then recovered from the residual reaction mass by distillation of the heat transfer medium or by filtration.

As can be seen above, the present condensation reactions are performed in the presence of a heat transfer medium. The only requirement for a solvent to be applicable as a heat transfer medium in the present process is that it must be inert to the reactants. The common hydrocarbon solvents and ethers such as, for example, benzene, toluene, xylene, n-hexane, chlorobenzene, diethyl ether, dibutyl ether, diglyme (diethyleneglycol dimethyl ether) triglyme (triethylenegylcol dimethyl ether), etc., all meet this requirement and are suitable for use as heat transfer media.

So that the present invention can be more clearly understood, the following examples are given for illustrative purposes:

I. Hexamethylborazole, 3.0 grams (18.2 mmoles) and 12.49 grams (54.7 mmoles) of p,p'-isopropylidenebisphenol were added to a flask containing about 25 ml. of xylene in a nitrogen atmosphere. The reaction mixture was heated under reflux for a period of about 8 hours at which time 1.59 grams (93.7% of theory) of methylamine had been evolved from the reaction mass. The xylene was then removed from the resultant reaction mass by distillation at reduced pressure, and a yellow solid polymeric product was recovered from the reaction vessel. Chemical analysis of the polymeric product yielded the following datum:

Calculated for $C_{16}H_{17}BO_2$: B=4.29%. Found in product: B=4.14%.

II. B-triphenyl-N-trimethylborazole, 7.37 grams (21.0 mmoles) and 21.30 grams (63.0 mmoles) of 4,4'-methylene-bis(2,6-dichlorophenol) were added to a flask containing about 50 ml. of diglyme in a helium atmosphere. The reaction mixture was heated under reflux for a period of about 12 hours at which time 1.77 grams (90.2% of theory) of methylamine had been evolved from the reaction mass. The diglyme was then removed from the resultant reaction mass by distillation at reduced pressure, and a yellow solid polymeric product was recovered from the reaction vessel. Chemical analysis of the polymeric product yielded the following datum:

Calculated for $C_{19}H_{11}BCl_4O_2$: B=2.55%. Found in product: B=2.43%.

III. B - triethyl-N-tri-n-propylborazole, 6.81 grams (23.4 mmoles) and 22.92 grams (70.2 mmoles) of 4,4'-sec-butylidene-bis(2-isopropylphenol) were added to a flask containing about 50 ml. of xylene in a nitrogen atmosphere. The reaction mixture was heated under reflux for a period of about 12 hours at which time 3.80 grams (91.5% of theory) of n-propylamine had been evolved from the reaction mass. The xylene was then removed from the resultant reaction mass by distillation at reduced pressure, and a yellow solid polymeric product was recovered from the reaction vessel. Chemical analysis of the polymeric product yielded the following datum:

Calculated for $C_{24}H_{33}BO_2$: B=2.97%. Found in product: B=2.85%.

Other modes of applying the principle of the invention may be employed, change being made as regards the details described, provided the features stated in any of the following claims or the equivalent of such be employed.

I, therefore, particularly point out and distinctly claim as my invention:

1. Solid, thermally stable organoboron resin consisting essentially of the recurring structural unit

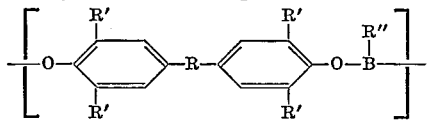

where R is selected from the group consisting of methylene, 2,2-propylene and 2,2-butylene, R' is selected from the group consisting of hydrogen, bromine, chlorine and alkyl of from 1 to 4 carbon atoms, and R'' is selected from the group consisting of alkyl of from 1 to 6 carbon atoms and phenyl, said resins being thermally stable at temperatures up to 400–500° C.

2. Solid, thermally stable organoboron resin consisting essentially of the recurring structural unit

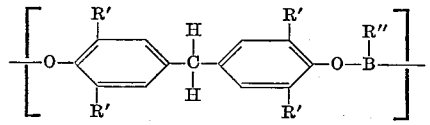

where R' is selected from the group consisting of hydrogen, bromine, chlorine and alkyl of from 1 to 4 carbon atoms, and R'' is selected from the group consisting of alkyl of from 1 to 6 carbon atoms and phenyl, said resins being thermally stable at temperatures up to 400–500° C.

3. Solid, thermally stable organoboron resin consisting essentially of the recurring structural unit

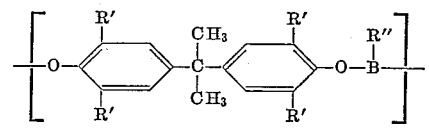

where R' is selected from the group consisting of hydrogen, bromine, chlorine and alkyl of from 1 to 4 carbon atoms, and R'' is selected from the group consisting of alkyl of from 1 to 6 carbon atoms and phenyl, said resins being thermally stable at temperatures up to 400–500° C.

4. Solid, thermally stable organoboron resin consisting essentially of the recurring structural unit

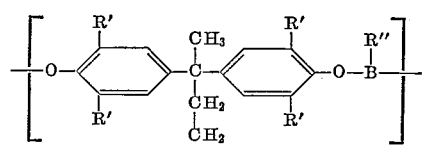

where R' is selected from the group consisting of hydrogen, bromine, chlorine, and alkyl of from 1 to 4 carbons, and R'' is selected from the group consisting of alkyl of from 1 to 6 carbon atoms and phenyl, said resins being thermally stable at temperatures up to 400–500° C.

5. The method for preparing solid, thermally stable organoboron polymers consisting essentially of the recurring structural unit

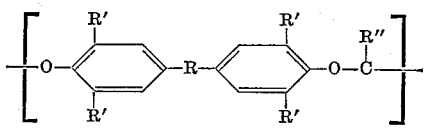

which comprises heating under reflux in an inert atmosphere a mixture of a bisphenol compound having the formula

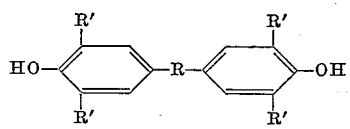

and a borazole having the formula $(R''BNR''')_3$ in the presence of a liquid heat transfer medium which is inert to the reactants, removing the volatile amine reaction product, and recovering said organoboron polymer from the resultant reaction mass, where R is selected from the group consisting of methylene, 2,2-propylene and 2,2-butylene, R' is selected from the group consisting of hydrogen, bromine, chlorine and alkyl of from 1 to 4 carbon atoms, R'' is selected from the group consisting of alkyl of from 1 to 6 carbon atoms and phenyl, and R''' is selected from the group consisting of hydrogen and alkyl of from 1 to 4 carbon atoms.

6. The method for preparing solid, thermally stable organoboron polymers consisting essentially of the recurring structural unit

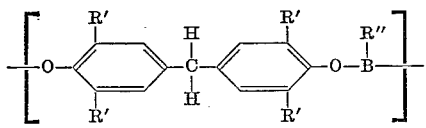

which comprises heating under reflux, in an inert atmosphere, in about a 3 to 1 molar ratio a mixture of bisphenol compound having the formula

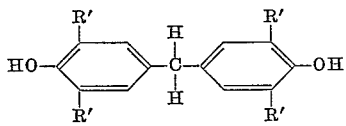

and a borazole having the formula (R″BNR‴)₃ in the presence of a liquid heat transfer medium which is inert to the reactants, removing the volatile amine reaction product, and recovering said organoboron polymer from the resultant reaction mass, where R′ is selected from the group consisting of hydrogen, bromine, chlorine and alkyl of from 1 to 4 carbon atoms, R″ is selected from the group consisting of alkyl of from 1 to 6 carbon atoms and phenyl, and R‴ is selected from the group consisting of hydrogen and alkyl of from 1 to 4 carbon atoms.

7. The method for preparing solid, thermally stable organoboron polymers consisting essentially of the recurring structural unit

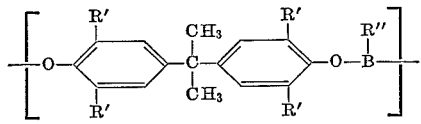

which comprises heating under reflux, in an inert atmosphere, in about 3 to 1 molar ratio a mixture of a bisphenol compound having the formula

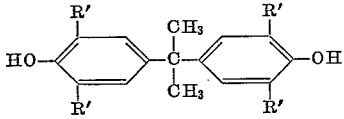

and a borazole having the formula (R″BNR‴)₃ in the presence of a liquid heat transfer medium which is inert to the reactants, removing the volatile amine reaction product, and recovering said organoboron polymer from the resultant reaction mass, where R′ is selected from the group consisting of hydrogen, bromine, chlorine and alkyl of from 1 to 4 carbon atoms, R″ is selected from the group consisting of alkyl of from 1 to 6 carbon atoms, and phenyl, and R‴ is selected from the group consisting of hydrogen and alkyl of from 1 to 4 carbon atoms.

8. The method for preparing solid, thermally stable organoboron polymers consisting essentially of the recurring structural unit

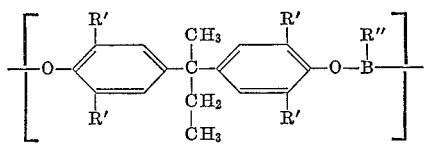

which comprises heating under reflux, in an inert atmosphere, in about 3 to 1 molar ratio a mixture of a bisphenol compound having the formula

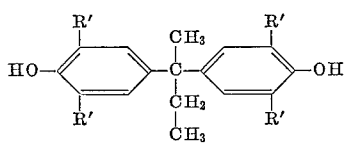

and a borazole having the formula (R″BNR‴)₃ in the presence of a liquid heat transfer medium which is inert to the reactants, removing the volatile amine reaction product, and recovering said organoboron polymer from the resultant reaction mass, where R′ is selected from the group consisting of hydrogen, bromine, chlorine, and alkyl of from 1 to 4 carbon atoms, R″ is selected from the group consisting of alkyl of from 1 to 6 carbon atoms and phenyl, and R‴ is selected from the group consisting of hydrogen and alkyl of from 1 to 4 carbon atoms.

References Cited by the Examiner

UNITED STATES PATENTS

| 1,953,741 | 4/34 | Bennett | 260—2 |
| 3,014,061 | 12/61 | Irish et al. | 260—462 |
| 3,042,636 | 7/62 | Rudner et al. | 260—47 |

WILLIAM H. SHORT, *Primary Examiner.*

UNITED STATES PATENT OFFICE
CERTIFICATE OF CORRECTION

Patent No. 3,203,930                                              August 31, 1965

Joseph G. Bower

It is hereby certified that error appears in the above numbered patent requiring correction and that the said Letters Patent should read as corrected below.

Column 4, lines 35 to 40, the structural formula should appear as shown below instead of as in the patent:

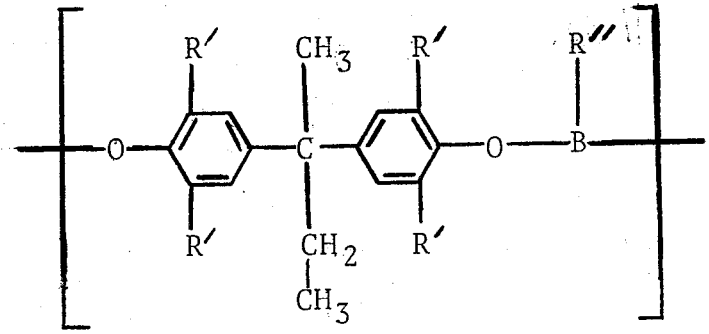

lines 50 to 55, the structural formula should appear as shown below instead of as in the patent:

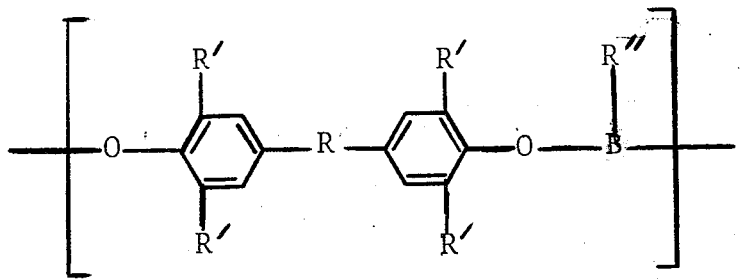

Signed and sealed this 3rd day of May 1966.

(SEAL)
Attest:

ERNEST W. SWIDER                                      EDWARD J. BRENNER
Attesting Officer                                         Commissioner of Patents

UNITED STATES PATENT OFFICE
CERTIFICATE OF CORRECTION

Patent No. 3,203,930                                    August 31, 1965

Joseph G. Bower

It is hereby certified that error appears in the above numbered patent requiring correction and that the said Letters Patent should read as corrected below.

Column 4, lines 35 to 40, the structural formula should appear as shown below instead of as in the patent:

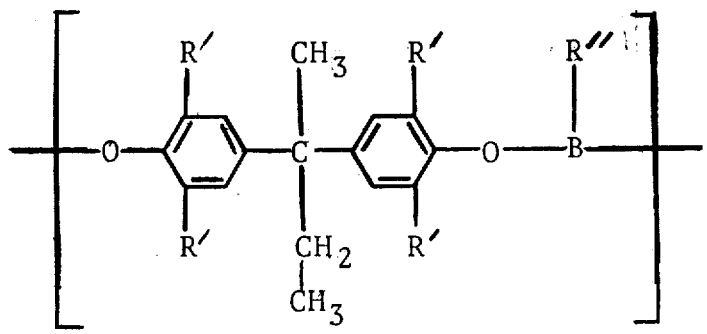

lines 50 to 55, the structural formula should appear as shown below instead of as in the patent:

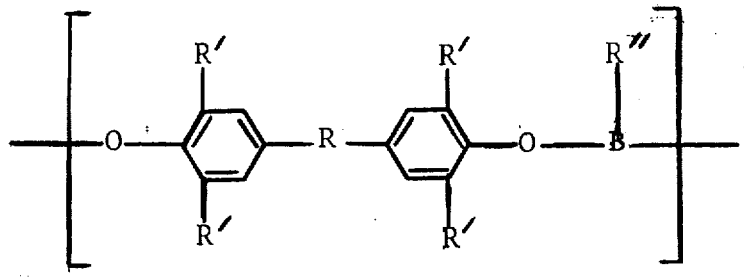

Signed and sealed this 3rd day of May 1966.

(SEAL)
Attest:

ERNEST W. SWIDER                             EDWARD J. BRENNER
Attesting Officer                            Commissioner of Patents